US008681325B2

(12) United States Patent  
Dressel et al.

(10) Patent No.: US 8,681,325 B2  
(45) Date of Patent: Mar. 25, 2014

(54) VERIFICATION APPARATUS AND METHOD FOR VERIFYING DIFFRACTIVE AND/OR REFLECTIVE SECURITY FEATURES OF SECURITY DOCUMENTS

(75) Inventors: Olaf Dressel, Wustermark (DE); André Leopold, Berlin (DE); Manfred Paeschke, Wandlitz (DE)

(73) Assignee: Bundesdruckerei GmbH, Berlin (DE)

( * ) Notice: Subject to any disclaimer, the term of this patent is extended or adjusted under 35 U.S.C. 154(b) by 315 days.

(21) Appl. No.: 13/264,563

(22) PCT Filed: Apr. 14, 2010

(86) PCT No.: PCT/EP2010/002485  
§ 371 (c)(1),  
(2), (4) Date: Oct. 24, 2011

(87) PCT Pub. No.: WO2010/118897  
PCT Pub. Date: Oct. 21, 2010

(65) Prior Publication Data  
US 2012/0033202 A1 Feb. 9, 2012

(30) Foreign Application Priority Data  
Apr. 14, 2009 (DE) .......................... 10 2009 017 708

(51) Int. Cl.  
*G06K 9/74* (2006.01)

(52) U.S. Cl.  
USPC .......................................................... 356/71

(58) Field of Classification Search  
None  
See application file for complete search history.

(56) References Cited

U.S. PATENT DOCUMENTS

| 5,751,412 A | 5/1998 | Duell et al. |
| 6,365,907 B1 | 4/2002 | Staub et al. |
| 6,750,465 B2 | 6/2004 | Franz-Burgholz et al. |
| 6,892,946 B2 | 5/2005 | Massen et al. |
| 2004/0101168 A1 | 5/2004 | Kostrzewski et al. |

FOREIGN PATENT DOCUMENTS

| DE | 100 28 239 A1 | 12/2001 |
| DE | 100 28 241 A1 | 12/2001 |
| EP | 1 826 729 A1 | 8/2007 |
| GB | 2 240 947 A | 8/1991 |
| WO | 94/06097 A1 | 3/1994 |

*Primary Examiner* — Kara E Geisel  
*Assistant Examiner* — Amanda Merlino  
(74) *Attorney, Agent, or Firm* — Laurence A. Greenberg; Werner H. Stemer; Ralph E. Locher

(57) ABSTRACT

A verification apparatus for security documents having at least one diffractive and/or reflective security feature, includes a support device having a support surface or plane for receiving the security documents, an optical capturing device, an illuminating device for illuminating the security document, and an evaluation device which evaluates information detected by the capturing device to perform a verification of the at least one security feature. A screen is disposed between the support surface or plane and the capturing device. Light diffracted or reflected by the at least one security feature can be imaged on the screen for detection by the capturing device. The screen can be controlled with regard to at least one optical property, particularly the opacity thereof. A verification method, wherein the opacity of the screen is varied, is also provided.

28 Claims, 3 Drawing Sheets

VERIFICATION APPARATUS AND METHOD FOR VERIFYING DIFFRACTIVE AND/OR REFLECTIVE SECURITY FEATURES OF SECURITY DOCUMENTS

BACKGROUND OF THE INVENTION

Field of the Invention

The invention relates to a verification apparatus for security documents having at least one diffractive and/or reflective security feature, wherein the verification apparatus comprises a support plate having a support surface for placing the security document on it, an optical capturing device, an illuminating device, with which the security document can be illuminated, an evaluation device, which evaluates the information items captured using the capturing device in order to verify the at least one security feature, and a screen, which is arranged between the support surface and the capturing device and on which light, which is diffracted or reflected by the at least one security feature, can be imaged for capture by the capturing apparatus. The invention furthermore relates to a method for verifying a security document.

It is known from the prior art to use various security features in order to allow substantiation of authenticity and, if appropriate, genuineness of documents and/or objects. For this reason, security features are sometimes also referred to as authenticity features.

Thus, all features which make imitation or counterfeiting of an object and/or a document more difficult than simply copying it are considered to be security features. A group of security features is formed in order to diffract and/or reflect light. These security features can be in the form, for example, of holograms, metallized structures, gratings or similar. They have in common that they either reflect light which is incident thereon in accordance with geometrical optics or diffract it in accordance with physical optics. The underlying physical process is here irrelevant.

For verifying such security features, provision is made in the prior art for the security feature to be illuminated at least partially with light, generally directed light, and for reflected or diffracted light to be detected.

DE 100 28 239 A1 discloses an apparatus for evaluating authenticity features with diffraction structures on a document, which is placed onto an examination surface of a test instrument and onto which an illumination source emits light, with the authenticity feature to be examined diffracting the beam from the illumination source and projecting it onto an evaluation unit inside the instrument. In order to ensure independence from the type and location of the diffraction pattern to be examined, provision is made for the diffraction pattern, which is derived from the document to be examined, to be projected onto a projection surface. The projected diffraction image is captured by a camera, which may be an area-scan camera or a line-scan camera, and evaluated. In the known apparatuses, which use a focusing screen as a projection surface, in each case one optical element, which is used for steering the light or beam used for illumination purposes, is coupled to said focusing screen. The focusing screen is moveable relative to a document which is placed onto the examination surface in order to allow an illumination region to be positioned on the authenticity feature using the optical element which is coupled to the focusing screen. In the known apparatuses, in each case at least one optical element is thus situated between the capturing device and the document or the examination surface, that is to say within the viewing region or capture region of the capturing device. Since a document having an authenticity feature to be examined is placed onto the examination surface in order to be verified, the authenticity feature is each time located at a slightly different position on the examination surface. It is therefore necessary in each case to move the focusing screen mechanically relative to the examination surface mechanically with the optical element, which steers the light for illumination onto the authenticity feature. If the aim is to additionally capture further information items using the capturing device, such as a photographic image of the document, it is necessary to move the focusing screen together with the optical element attached thereto out of the capture region of the capturing device. The known verification apparatuses thus require great mechanical outlay for positioning the focusing screen. Moreover, the capturing of different information items is dependent on a movement speed of the focusing screen.

Moreover, mechanically controlled devices are typically susceptible to faults. Since security features are not only examined using stationary verification apparatuses, but also for example security features on packaging or the like are used for identification of objects, there is a need for providing compact and robust verification apparatuses which are not susceptible to faults and can be used, for example, as portable appliances.

BRIEF SUMMARY OF THE INVENTION

The invention is therefore based on the technical object of providing an improved verification apparatus and a method for verifying security features, which are more robust and less susceptible to faults than the known apparatuses. It is furthermore desirable to allow for the capturing of various types of information items relating to the security feature and/or a document to which the security feature is attached and/or on which it is formed.

The object is achieved according to the invention by way of the screen in the apparatus mentioned in the introduction being configured such that it is controllable, for example switchable, in terms of at least one optical property, in particular its opacity. Particularly preferably, the opacity of the screen can be varied between a diffusely scattering state and a transparent state. It is thus possible to capture first information items, for example a photographic image of the document and/or of the security feature, while the screen is operated in the transparent state and then, after the optical property opacity of the screen has been changed in a controlled manner to a diffusely scattering state, to image on the screen light that has been diffracted and/or scattered at the security feature in order to capture said light using the capturing device. A switchover can be done quickly. This creates the possibility of capturing, in quick succession, different optical properties of the security document using the capturing device. Movement of mechanical parts is not necessary and can be dispensed with.

Various screens are known from the prior art which can be controlled in terms of an optical property. A screen which can be controlled in terms of its opacity for example can comprise, for example, a polymer dispersed liquid crystal layer which can be switched via transparent electrodes.

If the screen is operated in the diffusely scattering state, the light beams, which are reflected or diffracted at the at least one security feature, can be imaged on the screen. This means that the points of incidence of the reflected and/or diffracted light are made visible for the capturing device in the form of scatter and/or reflection points. At the transmission locations, diffuse scattering takes place such that a directed light beam produces at the location of incidence on the screen an image which can be captured by an optical capturing device. As the source for the directed light, the illuminating device preferably comprises a laser. This has the advantage that high light intensities for illuminating the at least one security feature are provided. In this way, security features that only have low diffraction efficiency can also be reliably verified.

In another embodiment, a reflection property of the screen is varied. Liquid crystals in the cholesteric phase exhibit a nematic order with a helical superstructure. Cholesteric liquid-crystal films therefore exhibit selective reflection of circularly polarized light. Light of one handedness is selectively reflected in one wavelength range. Thus light of suitable circular polarization can pass through the screen. The light diffracted by the security feature to be verified strikes the screen with the opposite handedness and is reflected at this screen and again strikes the security document, where, upon incidence, it is diffusely scattered and a projection, for example projection points, is produced. This projection can be captured through the screen. The wavelength selectivity is dependent on the pitch of the helical superstructure. Since the alignment of the liquid crystals can be influenced by applying an electric field, the reflection property of the screen can be controlled. Other embodiments that change the reflection properties in a controllable fashion are also conceivable.

A further advantage of the use of a screen having variable optical properties is that a change of the optical property can be used to vary the extent of the illumination region by changing the optical properties. In particular, if the opacity of the screen is changed from the transparent state into the diffusely scattering state, the beam is widened when the light used for excitation and producing the illumination region passes through.

Based on a capture region of the capturing apparatus, the screen can cover the entire area or part of the area of the document support surface. Complete coverage, or coverage of the entire capture region of the capturing apparatus, is preferred. In this way, security features which are arranged at various locations and project light onto the screen at different diffraction and/or reflection angles can be reliably verified.

The screen is configured to be spaced apart from the support surface. In a preferred embodiment, the screen is formed on a support device. The support device is preferably in the form of a plate, for example a glass plate or Plexiglas plate, on the rear side of which the screen is formed.

In one embodiment, the illuminating device is configured such that it comprises a controllable optical element, which is separate from the screen and arranged at a distance and with which a spatially delimited illumination region, which is produced by way of a directed light beam in the support surface, can be positioned in the support surface in a two-dimensional manner. The expression "can be positioned in a two-dimensional manner" here means that the spatially delimited illumination region can be positioned in a plane which is defined by two non-collinear vectors. Thus, when the document is illuminated, a spatially delimited illumination region, which is produced in the support surface by a directed light beam, is positioned in the support surface in a two-dimensional manner using a controllable optical element, which is separate from the screen and arranged at a distance, such that the at least one diffractive and/or reflective security feature is at least partially illuminated. In this manner, the diffracted or reflected light is imaged on the screen and can be captured by the capturing device. Mechanical movement of the focusing screen or the screen, as is necessary in the prior art, is therefore no longer necessary.

The controllable optical element for positioning the illumination region can be, for example, a micromirror device. An MMD can reflect light at various solid angles in a controlled fashion. The moveable micromirror can be controlled with a high degree of precision and high speed in order to reflect the light beam of a light source in a directed manner.

The controllable optical element is preferably matched to the wavelength of the light produced by the light source.

In a compact construction where the light which strikes the at least one security feature in a directed fashion can be guided onto the at least one security feature at as obtuse an angle as possible, the light for illuminating the at least one security feature is guided through the screen onto the security feature. In the case of such an arrangement, the controllable optical element can be arranged next to the capturing device. The directed light can be produced for example by a light source which is arranged laterally next to the support surface and emits the light to the controllable optical element laterally past the screen or likewise through the screen.

In one embodiment of the invention, provision is made for a control device which is coupled to the screen, the capturing device and the illuminating device and is configured for controlling such that, during the capturing of the information items using the capturing device, first information items are captured while the screen is in the transparent state, and at least one second information item is captured while the screen is in the diffusely scattering state. Such embodiments allow the capture and evaluation of different information items relating to the document on which the at least one security feature is arranged or to the security feature.

In a preferred development of the invention, provision is made for the evaluation device to be configured to determine, from the first information items, a position of the at least one diffractive and/or reflective security feature, and for the control device to be coupled to the illuminating device and be controlled by it such that the at least one diffractive and/or reflective security feature is illuminated in a directed fashion while the second information items are captured. In this development, the position of the at least one security feature on the support surface is determined for example from a photographic image of the security document which was recorded while the screen was in the transparent state. This means that the position of the security feature is determined reliably independently of a precise positioning of the document with the at least one security feature on the support surface.

Subsequently, the illumination region is positioned in a directed manner in the region of the diffractive and/or reflective security feature in order to record, on the screen operated in the diffuse state, a diffraction and/or reflection pattern produced by the security feature and subsequently evaluate it.

In one embodiment of the invention, provision is made for the evaluation unit to be configured to calculate, on the basis of the position of the at least one diffractive and/or reflective security feature, difference information items which are compared to the captured second information items in order to verify the at least one diffractive and/or reflective security feature. This embodiment allows the prediction of in each case the deviating (owing to the variable positioning of the security feature on the support surface) diffraction and/or reflection image, which is formed on the screen, and the comparison thereof with the actually measured or captured image on the screen. In this way, it is possible to achieve a higher degree of precision with respect to the verifiable and distinguishable diffraction and reflection image.

In a further embodiment of the invention, the screen comprises a volume structure or at least one surface structure facing the support surface in order to excite light which strikes the screen at this volume structure or surface pattern at angles other than 90° and which is diffracted and/or reflected in particular by the document, to scatter and/or reflect, in particular multiple scattering and/or multiple reflection. This scattering and/or reflection can then be captured more easily as reflection and/or scatter points.

For verifying reflective or diffractive security elements, a screen having such a structure can be used, as can a screen whose document-facing side has a partly reflective coating, even without the possibility of changing the screen in a controlled manner in terms of an optical property. What is essential here is that the light which is directed at the security feature can in both cases be steered onto the document through the screen. In this respect, use is made in the case of the first embodiment of the fact that the light passes through the screen substantially at a right angle or nearly a right angle and is thus not influenced by the volume or surface structure of the screen or influenced only to a small extent. The light that is reflected and/or diffracted by the security feature, however, strikes the screen generally at an angle that is markedly different than 90° and is, as explained, more strongly influenced, with the result that scatter points are capturable on the screen.

If the screen has a semi-reflective coating, the light passes through the screen onto the security feature, and is diffracted and/or reflected and some is cast back onto the document at the screen with the partially reflective coating and produces a projection. Projection points are produced, for example, if individual directed light beams are produced by the reflection and/or diffraction at the security feature and cast back by it. Since the coating of the screen is only partially reflective, the projection, which comprises for example projection points, and other features can be detected through the screen with the partially reflective coating. These embodiments thus represent alternative, independent inventive solutions to the technical problem. In a variant of the embodiment with the partially reflective coating, light which is diffracted or reflected by the at least one security feature is, so as to be captured by the capturing device, not imaged onto the screen but back onto the document by way of reflection at the screen.

The invention will be explained in further detail below with reference to a drawing, in which:

DESCRIPTION OF THE INVENTION

Figure 1:
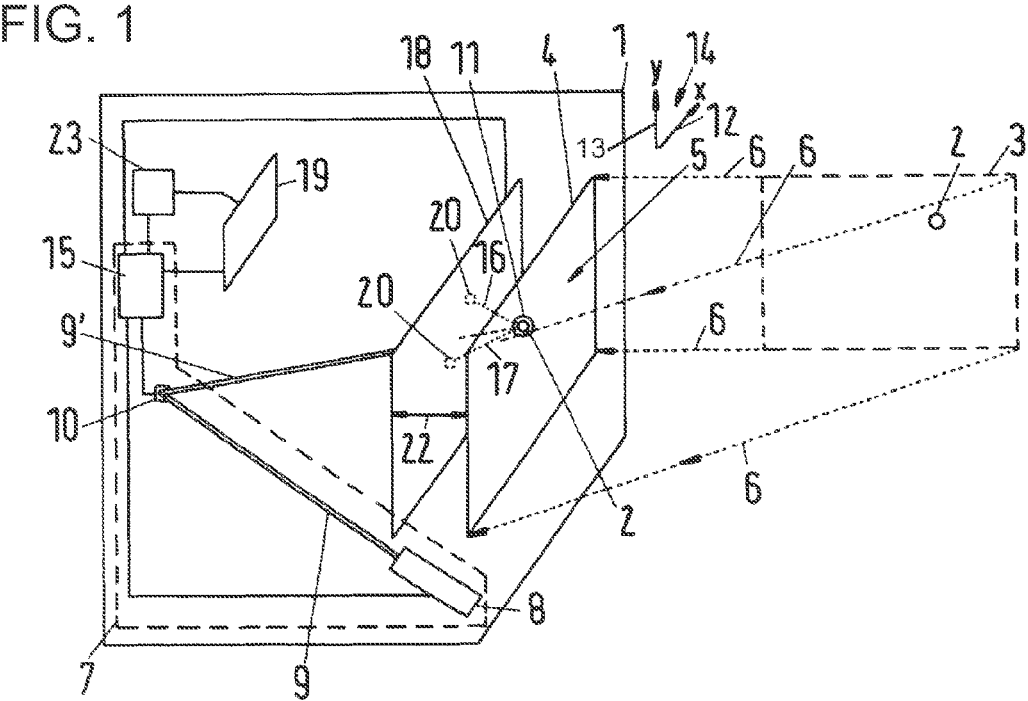
FIG. 1 shows a schematic of a verification apparatus.

FIG. 1 shows a schematic of a verification apparatus 1. The verification apparatus 1 is configured for verifying at least one diffractive and/or reflective security feature 2. Verification refers to any process in which an examination is carried out as to whether a relevant security feature is present and, should this be the case, whether it might additionally meet particular specifications in order to allow authenticity of the security feature to be ascertained. The security feature 2 is typically formed and/or arranged on a security document 3. A security document is a personal document such as passports, identity cards, driver's licenses, identification documents, valuable documents such as checks, credit cards, postal stamps, tokens, but also packaging or objects which are provided with a security feature, which is also referred to as an authenticity feature.

The verification apparatus 1 comprises a support plate 4 having a support surface 5. The support surface in most embodiments will be planar. However, embodiments in which the support surface is curved in order to be able to test security features attached to a curved surface are conceivable. In all cases the support surface is configured such that the security feature bears against the support surface.

In the embodiment shown in FIG. 1, the security document 1 (indicated by a dashed line) thus bears, with the security feature 2, against the support plate 4, i.e. against the support surface 5, as is indicated by arrows 6.

In order that the security feature 2, which is configured to diffract and/or reflect incident light, can be verified, it is thus necessary to at least partially illuminate the security feature. To this end, the verification apparatus 1 comprises an illuminating device 7. The illuminating device 7 comprises, in the embodiment shown, a light source 8 in the form of a laser. The light source 8 emits directed light 9. The directed light 9 from the light source 8 is steered onto a controllable optical element 10. This deflects the directed light to become light beam 9', which produces in the support surface a spatially delimited illumination region 11. The controllable optical element is configured such that it can position the illumination region 11 in the support surface 5 in a two-dimensional manner. This means that the spatially delimited illumination region 11 can be positioned at different positions on the support surface 5. It can therefore be moved in terms of its position both in the X-direction 12 and in the Y-direction 13 of a coordinate system 14. The coordinate system 14 is associated with the support surface 5.

The controllable optical element 10 is preferably in the form of what is referred to as a micromirror device (MMD). This comprises a micromirror which is positionable in a driven manner. In some embodiments, the mirror oscillates continuously. As a result, the reflected light beam 9' or the illumination region 11 is guided over an area of the support surface, preferably one comprising the entire support surface, in a scanning manner. If only the security feature 2 is intended to be illuminated, the emission of the light 9 of the light source 8 must be time-synchronized with the oscillation of the mirror of the controllable optical element 10. This can be done using a control device 15. In this case, the light source 8 is operated in a pulsed manner. The light source only emits light 9 while it is steered by the controllable optical element 10 onto the security feature 2.

If the aim is to verify a wavelength-selective security feature, which comprises for example an optically thick grating, for example a volume hologram, the controllable optical element is preferably selected such that it matches the corresponding wavelength. If the light source used is for example an Nd:YAG laser, generating light with a wavelength of 1064 nm, often frequency-doubled light having a wavelength of 532 nm is used. Such a security feature that reflects and/or diffracts in the green wavelength range can also be verified, for example, visually. In such a case, the controllable optical element is matched to this wavelength of 532 nm. If the intention is to verify security features of reflective design or security features which comprise an optically thin grating, such as a metal thread or a refractive embossing layer, precise matching with respect to the wavelength is not necessary.

In principle, the excitation can take place in a manner such that it matches the corresponding security feature to be verified in any suitable wavelength range, i.e. in the infrared, visible and/or ultraviolet wavelength range.

If the security feature 2 is illuminated, the reflected light 9', which strikes the support surface 5 from the controllable optical element 10, is reflected and/or reflectively diffracted at the security feature 2. This thus takes place when the illumination region 11 is at least partially, preferably completely, illuminated by the optical element. This is of course dependent on the proviso that in the case of a diffractive security feature, the remaining diffraction conditions or prerequisites for diffraction/reflection (for example an angle of incidence, a wavelength of the light etc.) have been met. The security feature 2 is configured such that it casts back reflected and/or diffracted light 16, 17 through the support plate 4, which is transparent.

A screen 18 is arranged such that it is spaced apart from the support surface 4. The reflected and/or diffracted light 16, 17 is imaged on the screen. In order to produce reflection points and/or scatter points 20 which are capturable by a capturing device 19 at incidence and/or transmission points through the screen 18 it is advantageous if the screen 18 diffusely scatters incident light. The reflection and/or scatter points 20 form a pattern on the screen 18, which pattern is characteristic of the respective security feature 2. Shape and dimension of the pattern is dependent on the geometry both of the light-guidance and of the arrangement of the support surface 5, the screen 18 and the capturing device 19 relative to one another. For example, a person skilled in the art will know that the size of the produced pattern of the reflection and/or scatter points 20 is dependent on a distance 22 between the support surface 4 and the plane of the screen 11. The greater the distance 22 between the screen 18 and the support surface 5, the greater the pattern formed by reflection and/or scatter points 20, which are produced by reflected and/or diffracted light beams 16, 17 which diverge from one another.

The pattern imaged by the reflection and/or scatter points 20 on the screen 18 is captured by the capturing device 19. The capturing device 19 can be any desired capturing device which can capture an optical image. Preferably it is a digital camera. The information items captured by the capturing device 19 are evaluated using an evaluation device 23 in order to verify the security feature 2. In the simplest verification embodiment, only an examination as to whether a pattern is captured by the capturing device 19 is carried out. If the verification requirements go beyond this, the captured image is compared to specification data or specification information items that characterize the security feature 2. In some embodiments, the evaluation device 23 is able here, on the basis of a position of the security feature 2 in the support surface 5, to calculate an expected pattern and compare it with the captured pattern so as to carry out verification, for example to examine the authenticity of the security feature 2.

In order to be able to determine the position of the security feature 2 in a simple manner, for example, it is advantageous if a photographic image of the support surface 5 or of the security document 3 thereon can be captured using the capturing device 19. Since such capturing is not possible through a screen which scatters diffusely, the screen 18 is configured to be controllable in terms of an optical property, for example its opacity. As a result, the opacity of the screen 18 can be controlled using the control device 15 or, in other embodiments, using another control device.

Any screen that is controllable in terms of its opacity can be used as the controllable screen 18. Various embodiments that can be used are known from the prior art. It is a prerequisite that the screen 18 is operable at least in a transparent state and in a diffusely scattering state. By way of example, the screen 18 can comprise a polymer dispersed liquid crystal layer (PDLC layer). Transparent electrodes, which are arranged relative to this PDLC layer, can be used to align liquid crystals in the layer, which causes a change in transparency or a change in the scatter behavior of the screen.

Since positioning of the security document 3 on the support surface 5, i.e. positioning of the security feature 2 in the support surface 5, is variable, the screen 18 in one embodiment is first operated in the transparent state. First information items are now captured using the capturing device 19. Typically this would be a photographic image of the support surface 5. Using known pattern recognition methods, it is possible, on the basis of any available reference data relating to security documents 3 or the security feature 2, for the evaluation device 23 to ascertain a position of the security feature 2 in the support surface 5. Subsequently, the control device 15 is used to drive the controllable optical element 10 and, if appropriate, the light source 8 such that the illumination region 11 at least partially covers the security feature 2. Furthermore, the screen 18 is brought into a diffusely scattering state. In this state, the diffracted and/or reflected light 16, 17 is now imaged on the screen 18 via the reflection and/or scatter points 20 for optimum capturing. The capturing device 19 is now used to capture second information items used for verifying the security feature 2, as has already been described above.

It is obvious to a person skilled in the art that a plurality of further examinations can be carried out in order to analyze and/or verify the security document 2, other security features of the security document 3 and/or the security document 3 itself. For this purpose, further elements can be provided in the verification apparatus. In particular, provision may be made for the illuminating device 7 to comprise further light sources (not shown) which excite the security document and/or security features it contains with visible, infrared or UV light. The arrangement of one of, or a number of, the light sources of the illuminating device can be configured such that the light directly strikes the support surface rather than passing through the screen 18.

It is preferred, however, that the light 9', which is used to verify the reflective and/or diffractive security feature 2 and is reflected by the controllable optical element 10, passes through the screen 18, which is controllable in terms of its optical properties. It is thus possible to implement beam widening of the reflected light 9 by means of controlling the opacity. In a preferred embodiment, the transparency (a proportion of the diffuse scattering) can be variably controlled over a wide region. Varying beam widening takes place in dependence on the selected transparency (the proportion of the diffuse scattering), and its impact can be seen in a different size of the illumination region in the support surface. As a result, a larger surface area of the security feature can be illuminated. Moreover, the security feature 2 is illuminated even if the illumination region is positioned not quite so precisely. Furthermore, a variation in the size of the illumination region can also bring about a variation in the pattern produced, as long as the security feature reflects and/or diffracts differently in different illuminated regions. This is especially true of holograms. A variation in the pattern with a variation in the transparency (diffuse scattering) can thus also be used to verify specific security features.

The focusing of the light is preferably chosen such that a focal point is situated in the screen. As a result, transmission through the screen is increased if said screen is in the diffusely scattering state.

In order that further analyses and verification steps can be carried out for the security feature 2 and/or the security document 3, the screen 18 can have further optical, electrical, chemical and in particular filter properties.

In order that a decay time for a fluorescent security feature can be analyzed in a simple manner, one embodiment provides for the light transmitted by the screen 18 initially to be captured after such a security feature has been excited. With a time offset, a second capturing step is carried out, in which the transparency of the screen changes, preferably decreases. If a change in transparency is matched to a decay time of the fluorescence, that is to say a lifetime of the states which trigger fluorescence in the respective security feature, it is possible to achieve that the captured brightness and/or intensity in both capturing steps is identical. If an actual decay time deviates from an expected decay time, intensity and/or brightness differences and/or color differences can be detected. Moreover, verification of individual fluorescent substances is possible in a simple manner by way of comparing captured information items. By varying the screen properties during verification, the local excitation energy can be varied.

Figure 2:
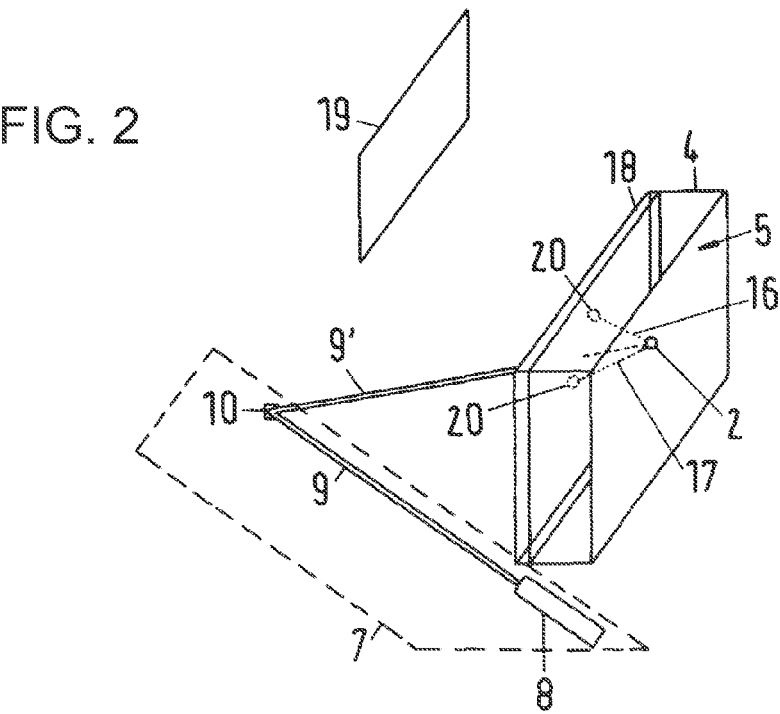
FIG. 2 shows a schematic of a detail of a further embodiment of a verification apparatus.

FIG. 2 shows a schematic of a detail of a further embodiment. Identical technical features have the same reference signs. In the embodiment, shown schematically in FIG. 2, the screen 18 is formed on a support plate 4 of expanded configuration. This embodiment has the advantage that the screen 18, which is otherwise usually in the form of a sheet, has a higher mechanical stability. Such a verification appliance is better suited for use conditions where vibrations and/or impacts occur because deflections of the sheet, which are caused by the vibrations and can occur in an embodiment according to FIG. 1, do not occur in this embodiment. These deflections influence the form of a pattern of reflection and/or scatter points.

Figure 3:
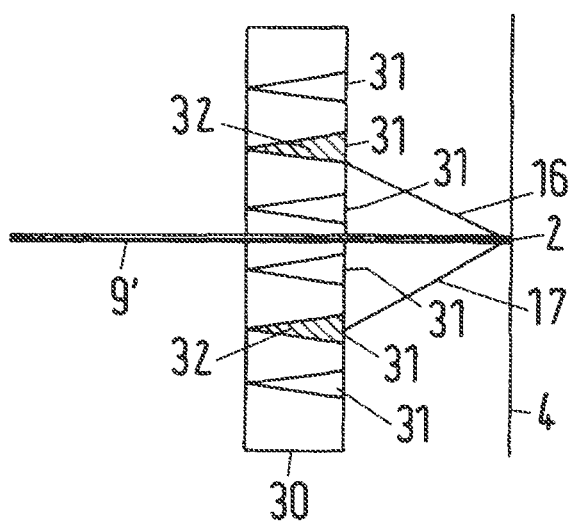
FIG. 3 shows a schematic of a detail according to another embodiment of a verification apparatus and FIG. 4 shows a schematic of a verification apparatus of still a further embodiment of a verification apparatus.

FIG. 3 furthermore shows schematically a detail of a further embodiment, in which the screen 30 has for example conical elements 31. In some design variants, these are in the form of cutouts. In other embodiments, the conical elements 31 are filled with a material which has a refractive index that differs from the remaining screen material. The internal structures are configured as a collimator such that they collect the exciting beams that run typically practically perpendicular toward the document and transmit them. The beams which emanate from the document or are reflected by it, on the other hand, have a significantly higher degree of deviation from the perpendicular and are widened at the screen by way of a diffuser and cause a detectable brightness difference. The embodiments have in common that diffracted and/or reflected light of the security feature 2, striking the screen 30 at angles other than 90°, cause reflection and/or scatter points 33, in particular at the edge of the cone elements 31. These facilitate capturing of the thus produced reflection and/or scatter points 32. In this embodiment, the light 9' which is used to illuminate the security feature 2 is preferably guided through the screen 30 such that it is guided between the conical elements, that is to say guided past them.

It is obvious to the person skilled in the art that here only exemplary embodiments of the invention are described. The individual described features can be used by themselves or in any desired combination in order to implement the invention.

Figure 4:
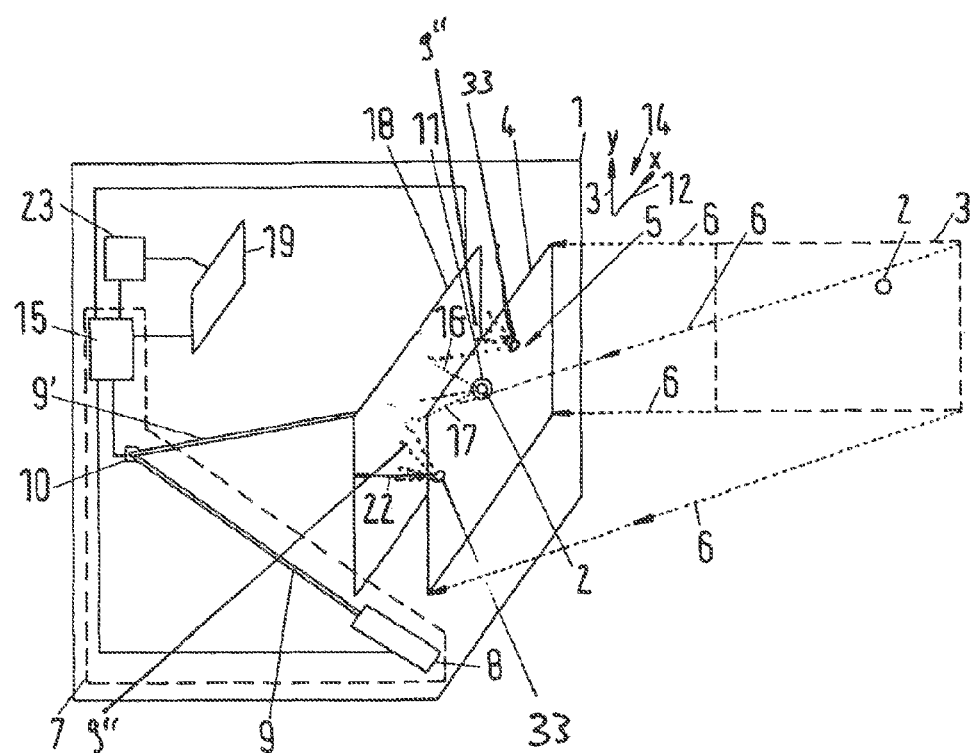

FIG. 4 shows an embodiment similar to that shown in FIG. 1, but here a reflection property of the screen 18 is controllable. The light 9' which is reflected/diffracted at the security feature 2 is partially reflected at a side of the screen that faces the security document 3 and is cast back onto the security document 3. There, projection points 33 are then detectable, which are capturable by the capturing device 19 through the screen 18.

If the screen with liquid crystals is in the cholesteric phase, for example selectively circularly polarized reflected/diffracted light, emanating from the security feature 2, is reflected at the screen 18 back onto the security document 3 and there produces the projection points 33. In the process, the polarization property of the light 9" emanating from the projection points is lost, with the result that said light can pass through the screen 18 and is capturable by the capturing device 19.

In one embodiment similar to that of FIG. 4, in which the screen has a partially reflective coating on the side that faces the security document and is not configured to be switchable, projection points are also detectable through the screen with the partially reflective coating.

LIST OF REFERENCE SIGNS 1 verification apparatus
2 security feature
3 security document
4 support plate
5 support surface
6 arrows
7 illuminating device
8 light source
9 directed light
9' reflected light
9" light emanating from projection points
10 controllable optical element
11 illumination region
12 x-direction
13 y-direction
14 coordinate system
15 control device
16, 17 reflected/diffracted light
18 screen
19 capturing device
20 reflection and/or scatter points
22 distance
23 evaluation device
30 screen
31 conical elements
32 reflection and/or scatter points
33 projection points

The invention claimed is:

1. A verification apparatus for security documents having at least one diffractive and/or reflective security feature, the verification apparatus comprising:
    a support device having a support surface or plane for placement of the security document thereon;
    an optical capturing device;
    an illuminating device for illuminating the security document;
    an evaluation device for evaluating information items captured by said capturing device to verify the at least one security feature; and
    a screen disposed between said support surface or plane and said capturing device, said screen imaging light diffracted or reflected by the at least one security feature for capture by said capturing device, and said screen being controllable in terms of at least one optical property.

2. The verification apparatus according to claim 1, wherein said at least one optical property is an opacity of said screen.

3. The verification apparatus according to claim 1, wherein said screen is configured for allowing light diffracted or reflected by the at least one security feature to be imaged on said screen for capture by said capturing device.

4. The verification apparatus according to claim 1, wherein said screen guides light through said screen onto the at least one security feature of the security document for illuminating the at least one security feature.

5. The verification apparatus according to claim 1, wherein said illuminating device includes a controllable optical element being separate from and disposed at a distance from said screen, said optical element permitting a spatially delimited illumination region, produced by a directed light beam at said support surface or plane, to be positioned in said support surface or plane in a two-dimensional manner.

6. The verification apparatus according to claim 5, wherein said controllable optical element positions said illumination region, illuminated by the light beam, in said support surface or plane.

7. The verification apparatus according to claim 1, wherein said illuminating device includes a laser as a light source.

8. The verification apparatus according to claim 2, wherein the opacity of said screen is variable between a diffusely scattering state and a transparent state.

9. The verification apparatus according to claim 8, wherein a transmission of said diffusely scattering state is variable.

10. The verification apparatus according to claim 8, wherein said illuminating device produces a directed bundled light beam being guided through said screen and widened if said screen is operated in said diffusely scattering state.

11. The verification apparatus according to claim 1, wherein said screen completely covers said support surface or plane with respect to a capture region of said capturing device.

12. The verification apparatus according to claim 1, wherein said screen is spaced apart from said support surface or plane.

13. The verification apparatus according to claim 1, wherein said screen is disposed on a side of said support device facing away from said support surface or plane.

14. The verification apparatus according to claim 8, which further comprises:
a control device coupled to said screen, to said capturing device and to said illuminating device;
said control device being configured for controlling capturing of the information items by capturing first information items using said capturing device with said screen in said transparent state, and capturing at least second information items with said screen in said diffusely scattering state.

15. The verification apparatus according to claim 14, wherein:
said evaluation device is configured to determine, from said first information items, a position of the at least one diffractive and/or reflective security feature relative to said support surface or plane; and
said control device is coupled to and controlled by said illuminating device for illuminating the at least one diffractive and/or reflective security feature in a directed fashion while said second information items are captured.

16. The verification apparatus according to claim 1, wherein said screen has a side facing the security document being controllable in terms of its reflection properties for steering the light being diffracted or reflected by the at least one security feature back onto the security document using said screen and imaging the light on the security document for capture by said capturing device.

17. The verification apparatus according to claim 15, wherein said evaluation device is configured to calculate, based on a position of the at least one diffractive and/or reflective security feature, reference information items being compared to said captured second information items to verify the at least one diffractive and/or reflective security feature.

18. A method for verifying a security document having at least one diffractive and/or reflective security feature, the method comprising the following steps:
placing a security document on a support surface or plane of a support device;
illuminating the security document using an illuminating device;
providing a capturing device;
providing a screen between the support surface or plane and the capturing device;
optically capturing information items relating to the at least one security document with the capturing device by capturing light diffracted or reflected at the at least one security feature and imaged with the screen;
changing at least one optical property of the screen in a controllable manner before, during or after the capture of the light diffracted or reflected at the at least one security feature and imaged with the screen; and
evaluating the captured information items to verify the at least one security feature.

19. The method according to claim 18, which further comprises carrying out the changing step by changing an opacity of the screen.

20. The method according to claim 18, which further comprises carrying out the step of capturing the light diffracted or reflected at the at least one security feature and imaged with the screen by capturing light diffracted or reflected at the at least one security feature and imaged on the screen.

21. The method according to claim 18, which further comprises guiding the light, for illuminating the at least one security feature of the security document, through the screen onto the security feature.

22. The method according to claim 18, which further comprises, during the illumination of the document, positioning a spatially delimited illumination region, produced at the support surface or plane by a directed light beam, in a two-dimensional manner in the support surface or plane with a controllable optical element being separate from and disposed at a distance from the screen, for at least partially illuminating the at least one diffractive and/or reflective security feature.

23. The method according to claim 22, which further comprises controlling an opacity of the screen as the optical property for varying an extent of the illumination region produced by directed light guided through the screen in the support surface or plane.

24. The method according to claim 23, which further comprises varying the opacity of the screen between at least a diffusely scattering state and a transparent state.

25. The method according to claim 18, which further comprises:
initially controlling the screen to be transparent and to capture first information items of the security document with the capturing device;
subsequently evaluating the first information items to ascertain a position of the at least one security feature in the support surface or plane; and
subsequently capturing second information items while at least partially illuminating the at least one diffractive and/or reflective security feature with the spatially delimited illumination region.

26. The method according to claim 25, wherein the first information items represent a photographic image.

27. The method according to claim 25, which further comprises:

calculating reference information items based on an ascertained position of the at least one diffractive and/or reflective security feature in the support surface or plane; and comparing the reference information items to the captured second information items to verify the at least one diffractive and/or reflective security feature.

28. The method according to claim 18, which further comprises carrying out the step of capturing the light diffracted or reflected at the at least one security feature and imaged with the screen by capturing light, reflected at the screen and cast back onto the security document, of the light diffracted or reflected at the at least one security feature.

* * * * *